March 27, 1951 P. R. MARZAN 2,546,466
FACSIMILE RECORDING APPARATUS
Filed July 21, 1949
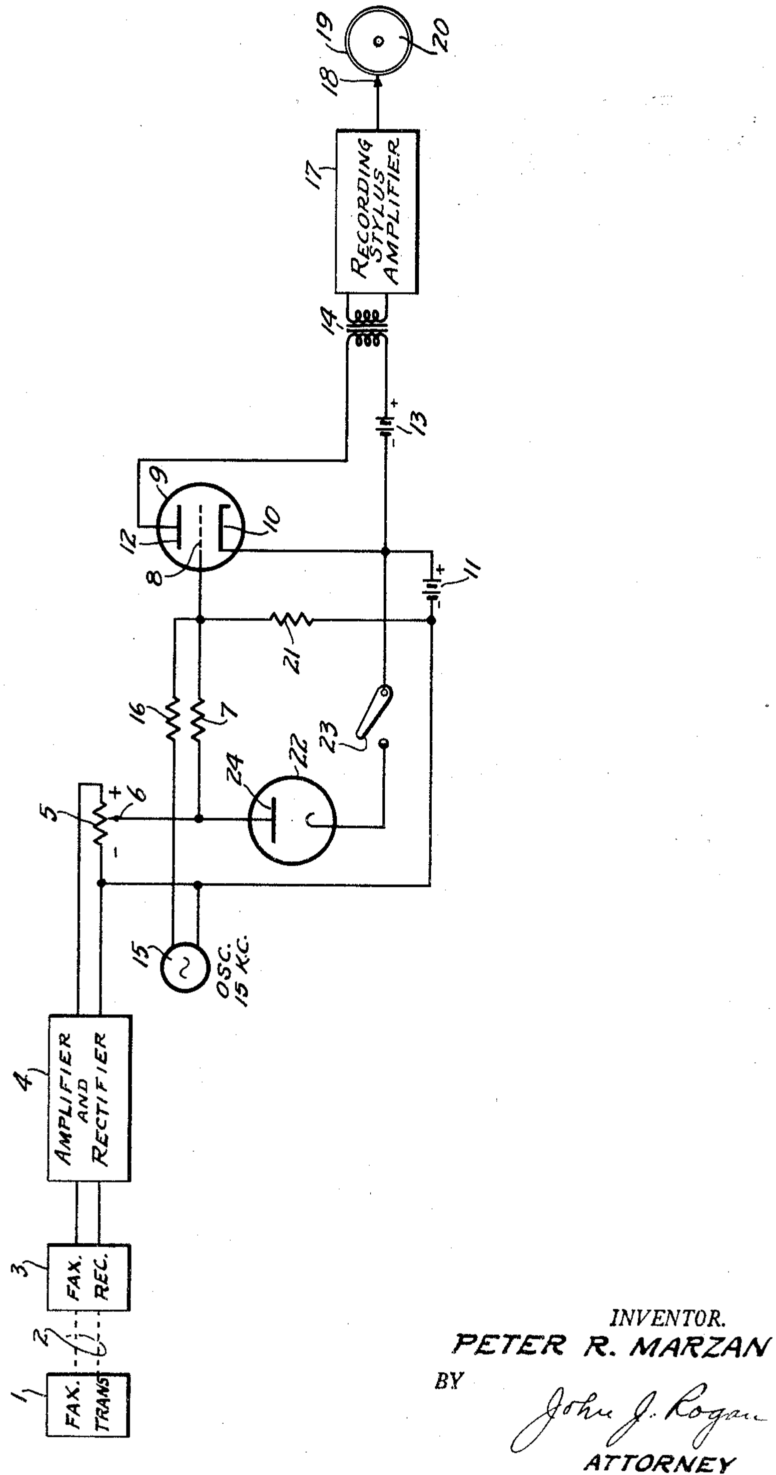
INVENTOR.
PETER R. MARZAN
BY John J. Rogan
ATTORNEY Patented Mar. 27, 1951

2,546,466

UNITED STATES PATENT OFFICE 2,546,466

FACSIMILE RECORDING APPARATUS

Peter R. Marzan, New York, N. Y., assignor to Times Facsimile Corporation, New York, N. Y., a corporation of New York Application July 21, 1949, Serial No. 105,918

7 Claims. (Cl. 178—6.6)

This invention relates to electric signal recorders and more particularly to recorders of the facsimile kind.

A principal object of the invention is to provide facsimile recording apparatus which can be easily adjusted for positive and negative recordings.

Another object is to provide facsimile recording apparatus of the kind wherein switching from positive to negative recordings is effected by applying a predetermined positive voltage to the grid of a modulator tube, and having means to prevent undesired switching to negative recording even when the received facsimile signals are above a level which would ordinarily result in automatically effecting such switching.

A feature of the invention relates to facsimile recording apparatus of the kind employing a local oscillator and amplifier modulator combination wherein the positive potential bias condition at the grid of the modulator determines whether the apparatus will record positively or negatively, and having a separate circuit which can be rendered effective to insure that only positive recordings are made.

Another feature relates to a novel facsimile recorder apparatus having a recording element arranged to be excited by an alternating or regularly pulsating current derived from a modulator tube whose input is excited by a local oscillator. The incoming facsimile signals are also applied to the input of the modulator, and their level can be adjusted to determine whether the facsimile recording should be positive or negative with respect to the original subject matter being transmitted. The apparatus is also provided with a separate shunt circuit between the grid and cathode of the modulator to make sure that the recording is always of one character.

The invention is in the nature of an improvement upon the facsimile recording apparatus disclosed and claimed in application Serial No. 781,027, filed October 21, 1947, but provides an additional control of the recorder action which is not attainable with the prior disclosure.

Referring to the drawing, the block 1 represents any well-known source of keyed signals, for example a facsimile transmitter. A typical transmitter is shown in U. S. Patent #2,015,742. If, for example, the transmitter 1 is transmitting a subject matter such as a map or other graphic or printed material having "light" and "dark" shaded areas, the transmitter can be adjusted so that the dark areas are represented by a transmitted electric signal of predetermined upper level, and the light areas are represented by a transmitted electric signal of a predetermined lower level. Merely for convenience of description, the higher amplitude signals can be referred to as "mark" signals, and the lower amplitude signals can be referred to as "space" signals. Thus the dark areas on the original subject matter to be transmitted will be reproduced as similar dark areas at the receiver, and the light areas at the transmitter will be reproduced as similar light areas at the receiver. In other words, positive recordings are effected. In other cases it may be desirable to have the recording in the form of a negative and to enable this negative recording to be effected even though signals representing positive transmissions are being received. The facsimile signals are transmitted over any suitable transmission line or channel 2, and are received in any suitable receiver 3. For example, if the signals are transmitted via radio, the device 3 may be any conventional radio receiver for producing in its output the detected "mark" and "space" signals. The demodulated or detected signals may then be impressed upon an amplifier-rectifier combination 4 across whose output is connected the potentiometer resistor 5 having an adjustable contact arm 6. The potentials developed across resistor 5 are direct current potentials and may have the uni-directional polarity as indicated in the drawing. The potentiometer arm 6 is connected through a relatively high resistance 7 to the control grid 8 of a suitable modulator amplifier tube 9. This tube may be either of the triode type or of any other form of multi-grid amplifier tube. The cathode 10 of this tube is normally biassed, for example by the biassing source 11, so that the tube 9 is at plate current cut-off. The anode 12 of the modulator tube is connected to the usual positive plate voltage supply 13 through the primary winding of a coupling transformer 14. Also connected across the control grid 8 and the cathode 10 is a local oscillator 15 in series with a relatively high resistance 16, for example at least 10,000 ohms. For example, the oscillator 15 may be a fifteen-kilocycle oscillator which generates sustained oscillations. Considering the grid-to-cathode circuit of tube 9, it will be seen therefore that the impedance or resistance 16 is in series with the grid-to-cathode impedance of tube 9 with respect to the source 15. So long as grid 8 is not drawing current, the impedance between the grid 8 and cathode 10 is high compared with the impedance 16, and therefore if tube 9 is plate current conductive, corresponding oscillations will appear at the transformer 14, and will be applied through the recording amplifier 17 to the recording stylus 18 which cooperates with the recording paper or blank 19 mounted on the facsimile scanning drum 20. It will be understood, of course, that the drum 20 and the stylus 18 are subjected to relative scanning motions so as to scan the entire area of the blank 19, as is well-known in the facsimile receiver art.

If the grid 8 becomes positively biassed with respect to ground, the impedance between the grid 8 and cathode 10 is extremely low in comparison with the impedance 16, and substantially all the oscillatory energy from the oscillator 15 is dissipated in the impedance 16, and substantially negligible oscillatory energy appears at the transformer 14. It will be understood, of course, that the grid 8 is returned to the cathode 10 through the conventional high resistance grid leak 21.

As described in the said application Serial No. 731,027, the position of the potentiometer arm 6 will determine whether the recording on blank 19 is a positive or negative recording. Thus considering the tube 9 normally biassed by source 11 beyond plate current cut-off, the arm 6 can be adjusted so that for the lower or space facsimile signal, zero plate current will flow through tube 9. On the other hand, for the higher level or mark facsimile signals, the potential applied from arm 6 through resistor 7 will bias the grid 8 sufficiently to cause tube 9 to act as a class-A amplifier and permitting plate current to flow representing the mark signals, and thus reproducing dark areas on the blank 19. Under this latter condition, the position of arm 6 is such that it does not apply sufficient positive bias to the grid 8 to cause current flow between the said grid 8 and cathode 10. In other words, with an appropriate position of arm 6, a certain amount of plate current flows through transformer 14 to represent the mark signal and to reproduce the dark areas; and when a space or lower facsimile signal is received, very little if any plate current flows through tube 9 and transformer 14, with the result that light areas are recorded on blank 19. In other words, direct or positive recordings are made on the said blank 19. When it is desired to invert the recordings, the arm 6 is moved further towards the positive end of resistor 5. The position of arm 6 under this condition is such that for the lower or space facsimile signal, the grid 8 is biassed to cause the tube 9 to act as a class-A amplifier for the oscillations from source 15, which thereupon appear at the transformer 14 and are correspondingly applied to the stylus 18 to produce dark areas instead of light areas. With this position of arm 6, should a high level or mark signal be received, a sufficiently positive bias will be applied to the grid 8 so as to attentuate the oscillations from the source 15 and prevent their appearance at the transformer 14. Thus by simple manipulation of the position of arm 6, either positive or negative recordings can be effected on the blank 19.

In certain cases it may be desirable to produce positive recordings with the greatest contrast between the light and dark areas on the recording blank 19. If the arm 6 is adjusted to give the greatest recording density corresponding to the mark signals, there is the danger of the system undesirably and automatically switching over to negative or inverse recording during the transmission. In order to overcome this difficulty, the arm 6 is connected through a rectifier or diode 22 and through a normally open switch 23 to the cathode 10. With this diode in circuit, assuming the arm 6 has been moved to control maximum density in the mark or dark recorded areas on blank 19, then any increase in the positive potential at grid 8 which would ordinarily cause the system to switch over to inverse or negative recording, is prevented, because at this point the positive potential applied to anode 24 of the diode, causes the said diode to pass current between its anode and cathode, and thus acts as a limiter for limiting the upper positive potential that can be applied to the grid 8. Thus the grid 8 can never reach such a positive potential that it acts as a relatively low impedance in series with the impedance 16 in the oscillator circuit. As a result, the arm 6 can be adjusted to any position on the potentiometer resistor 5, without danger of the system undesirably switching over to inverse recordings. One of the additional advantages provided by the diode 22 and the switch 23, is that it is possible to change the per cent of contrast between the light and dark recorded areas on the blank 19.

While reference has been made to a recorder of the stylus recording type, it will be understood that the invention is not limited to that particular type of recorder. The output of amplifier 17 can be applied to the recording element of any other well-known type of facsimile recorder, such for example as a recorder employing a sensitized photographic film and a recording lamp, in which event the signals from amplifier 17 will control the brightness of the recording lamp in the well-known manner.

While in the foregoing description and in the drawing reference is made to the use of a rectifier between the facsimile receiver 3 and the potentiometer 5 this is not absolutely necessary. Usually the facsimile signals consist of an alternating current in the form of an audio frequency carrier. The received alternating current audio frequency facsimile signals from the receiver 3 can be applied directly to the potentiometer 5 since the tube 9 will act as a demodulator and will produce in its output pulses of the carrier frequency.

The features disclosed herein but not claimed are claimed in copending U. S. application Serial No. 731,027, filed October 21, 1947 (U. S. Letters Patent No. 2,542,152).

While one particular embodiment has been described herein, it will be understood that various changes and modifications may be made without departing from the spirit and scope of the invention.

What is claimed is:

1. Facsimile recording apparatus of the type employing a recording blank and a recording element which responds to received signals of two different magnitudes representing respectively dark and light areas to be reproduced on said blank, the combination with said blank of a local oscillator, a grid-controlled amplifier tube connected between said oscillator and said recording element for supplying recording potential to said recording element, means to apply said signals to the control grid of said amplifier tube, means normally biassing said control grid against grid current flow, means to adjust the level of the signals applied to said grid to determine whether the recording on said blank shall be of a positive or a negative character, and separate means also connected to said control grid for restricting said recording to a positive character.

2. Facsimile recording apparatus according to claim 1, in which the said adjusting means comprises a potentiometer having said signals developed thereacross the contact arm of said potentiometer being connected to the control grid of said amplifier tube.

3. Facsimile recording apparatus according to claim 1, in which said adjusting means comprises a potentiometer across which said signals are developed said potentiometer having a manually adjustable contact arm which is connected to the control grid of said amplifier tube and to the anode of a diode which constitutes said separate means.

4. Facsimile recording apparatus according to claim 1, in which said adjusting means comprises a potentiometer across which said signals are developed a contact arm of said potentiometer being connected to the control grid of said amplifier tube and to the anode of said diode which constitutes said separate means, said control grid being also connected through an impedance to said local oscillator.

5. Facsimile recording apparatus according to claim 1, in which the last-mentioned means comprises a diode having its anode connected to said adjusting means and its cathode connected through a manually operable switch to the cathode of said amplifier tube.

6. Facsimile recording apparatus of the type employing a recording blank which responds to rectified mark and space signals representing dark and light areas to be reproduced on said blank, the combination with said blank of a grid-controlled modulator-amplifier tube responsive to said signals, an oscillator-generator connected to the input of said tube, means biassing said tube to plate current cut-off for relatively small space signals of predetermined amplitude to produce recording currents in the output of said tube, means to reduce the grid-to-cathode impedance of said tube in response to marking signals above said predetermined amplitude to effectively disable said tube as an amplifier of said oscillations whereby said recording is inverted as regards dark and light areas, and separate means connected to the input of said tube for restricting the recording to a positive independently of said predetermined amplitude when positive signals are being received.

7. Facsimile recording apparatus according to claim 6, in which the last-mentioned means includes a diode bridged across the control grid and cathode of said tube for limiting the positive potentials applied to said control grid to said predetermined amplitude.

PETER R. MARZAN.

REFERENCES CITED

The following references are of record in the file of this patent:

UNITED STATES PATENTS

| Number | Name | Date |
|---|---|---|
| 2,397,559 | O'Brien | Apr. 2, 1946 |
| 2,453,905 | Grib | Nov. 16, 1948 |
| 2,457,131 | Curtis | Dec. 28, 1948 |
| 2,506,668 | Haynes | May 9, 1950 |